United States Patent [19]

Ogawa et al.

[11] 4,016,341
[45] Apr. 5, 1977

[54] BULK POLYMERIZATION OF VINYL CHLORIDE

[75] Inventors: Kinya Ogawa; Kazuhiko Kurimoto; Yoshitsugu Eguchi; Satoshi Kuwata, all of Ibaragi, Japan

[73] Assignee: Shin-Etsu Chemical Company Limited, Tokyo, Japan

[22] Filed: Oct. 23, 1975

[21] Appl. No.: 625,044

[30] Foreign Application Priority Data

Oct. 28, 1974 Japan .................. 49-124096

[52] U.S. Cl. .................. 526/62; 427/230; 427/239; 427/236
[51] Int. Cl.$^2$ .................. C08F 3/22
[58] Field of Search .......... 260/695; 427/239, 230, 427/236, 238, 203; 428/35; 23/285; 526/62, 74

[56] References Cited

UNITED STATES PATENTS 2,380,552  7/1945  Semon et al. .................. 526/62
3,778,423  12/1973  Reiter .................. 526/62

Primary Examiner—Ronald H. Smith
Assistant Examiner—S. Silverberg
Attorney, Agent, or Firm—Bierman & Bierman

[57] ABSTRACT

Vinyl chloride monomer, or a mixture thereof with a copolymerizable monomer or monomers, is bulk-polymerized so that the deposition of polymer scale on the inner walls of the polymerization vessel and other surfaces in contact with the monomer or monomers can be greatly reduced by coating them with phosphoric esters, polyphosphoric esters or their alkali metal salts before the polymerization is commenced. Cleanup operations following each polymerization run are much simplified.

27 Claims, No Drawings

BULK POLYMERIZATION OF VINYL CHLORIDE

FIELD OF THE INVENTION

This invention relates to an improved method for the bulk polymerization of vinyl chloride monomer or a mixture thereof with one or more copolymerizable monomers containing vinyl chloride as their main component.

DESCRIPTION OF THE PRIOR ART

In the bulk polymerization of vinyl chloride monomer or a mixture thereof with a copolymerizable monomer or monomers, it is usual that polymer scale is deposited on the inner walls of a polymerization vessel, the blades of a stirrer and other surfaces in contact with the monomer or monomers. As a result of this, much labor and time spending cleaning work has to be done within the polymerization vessel at intervals of polymerization runs, and production efficiency tends to decrease due to reduction of heattransfer in the polymerization vessel, while it is possible that any released scale enters into the resultant polymer product, thereby lowering its quality.

Under the circumstances, attempts have been made to reduce the formation of polymer scale in the bulk polymerization of vinyl chloride and other vinyl monomers by, for example, use of a stirrers having blades with improved designs, but no successful results have been obtained.

OBJECTS OF THE INVENTION

It is therefore an object of the present invention to provide a method of bulk-polymerizing vinyl chloride monomer or a mixture thereof with a copolymerizable monomer or monomers, by which the deposition of polymer scale on the inner walls of the polymerization vessel, the blades of the stirrer and other surfaces in contact with the monomer or monomers can be greatly decreased, and any polymer scale deposited can be easily removed by washing with water.

It is a further object of the present invention to provide a method of bulk polymerization or copolymerization in which production efficiency is greatly improved and lowering of the quality of the polymer product can be prevented.

SUMMARY OF THE INVENTION

The above objects of the present invention are achieved, generally speaking, by a method for the bulk polymerization of vinyl chloride monomer or a mixture thereof with a copolymerizable monomer or monomers which comprises coating the walls of a polymerization vessel, and other surfaces coming into contact with the monomer or monomers, prior to the polymerization, with at least one phosphoric compound selected from the group consisting of phosphoric esters, polyphosphoric esters and alkali metal salts thereof.

DETAILED DESCRIPTION OF THE INVENTION

The phosphoric and polyphosphoric esters useful as the coating material in accordance with the present invention include mono-, di-, tri- or polyesters of phosphoric acid, pyrophosphoric acid, triphosphoric acid, trimetaphosphoric acid, tetrametaphosphoric acid and hexametaphosphoric acid. Typical examples of the above-mentioned esters include trimethyl phosphate and polyoxyethylene monolauryl phosphate. The alkali metal salts of the phosphoric or polyphosphoric esters include lithium, sodium and potassium salts of the partial esters of the above-named phosphoric and polyphosphoric acids.

Alcohols useful for forming esters with the above-named phosphoric and polyphosphoric acids include monovalent alcohols, polyvalent alcohols and certain derivatives thereof. The monovalent alcohols are exemplified by saturated aliphatic alcohols, such as, methyl alcohol, ethyl alcohol and t-butyl alcohol; unsaturated aliphatic alcohols, such as allyl alcohol and crotyl alcohol; alicyclic alcohols, such as cyclopentanol and cyclohexanol; aromatic alcohols, such as benzyl alcohol and cinnamyl alcohol; heterocyclic alcohols, such as furfuryl alcohol; and monoethers of polyoxyethyleneglycols expressed by the general formula $R(OC_2H_4)_nOH$ where R is a monovalent hydrocarbon group and n is a positive integer.

The polyvalent alcohols useful for forming esters are exemplified by divalent alcohols; such as ethyleneglycol, trivalent alcohols, such as glycerine; and polyvalent alcohols and their derivatives, such as 1,4-sorbitan, 1,4,3,6-sorbide, sorbitol, mannitol and polyoxyethylene adducts of polyvalent alcohols, e.g., polyoxyethylene sorbitol.

Furthermore, the phosphoric and polyphosphoric esters useful for forming alkali metal salts with alkali metals, such as lithium, sodium and potassium, include the partial esters formed by the above-named phosphoric or polyphosphoric acids and the above-named alcohols, as well as naturally occurring compounds with similar structures, such as glucose-1-phosphoric acid, glucose-6-phosphoric acid; D-fructose-6-phosphoric acid and phytic acid. Among these the most preferable are the compounds with substantial solubility in water.

To the phosphoric and polyphosphoric esters and their alkali metal salts as described above (hereinafter called "phosphoric coating compounds") may be added a borate and/or a polymerization inhibitor. In this case, the addition of a borate serves to help removal of any polymer scale by water washing, while the polymerization inhibitor serves to prevent polymer scale formation more effectively. The ratio of the amount of such additive or additives to the phosphoric coating compounds is preferably from 0.1:1 to 10:1 by weight.

Illustrative of the borates that are added to the phosphoric coating compounds are alkali metal borates, such as sodium borate and potassium borate; alkali earth metal borates such as calcium borate and ammonium borate.

Illustrative of the polymerization inhibitors that may be added to the phosphoric coating compounds are amines, such as diphenylamine and triphenylamine; $\alpha$-alkyl-$\beta$-unsaturated ketones, such as methylisopropenylketone and 3-methyl-4-phenyl-3-penten-2-one; quinones, such as hydroquinone and naphthoquinone; phenolic compounds, such as phenol, cresols, cumylphenols, naphthols, pyrocatechal, resorcinol, pyrogallol, phloroglucinol, t-butylcatechol and bisphenol A; aromatic nitro compounds, such as nitrobenzene and nitronaphthalenes; vinylpyridines, such as 2-vinylpyridine, 2-methyl-5-vinylpyridine and 2,4-dimethyl-6-vinylpyridine; styrene and its derivatives, such as monochlorostyrenes, 3,4-dichlorostyrene, $\alpha$-methylstyrene and $\alpha$-methyl-3,4-dichlorostyrene; conjugated diene hydrocarbons, such as 1,3-butadiene, isoprene, 2,3-dimethylbutadiene, cyclopentadiene and chloroprene; unsaturated cyclic monoolefins, such as cyclopentene, cyclohexane and cycloheptene; unsaturated monocarboxylic acids, such as sorbic acid, furylacrylic acid, linoleic acid and β-vinylacrylic acid; and unsaturated aldehydes, such as cinnamic aldehyde, acrolein, methacrolein, crotonaldehyde and tiglic aldehyde.

In accordance with the method of the present invention, the phosphoric coating compound or compounds, is applied over the inner walls of a polymerization vessel in which the bulk polymerization of vinyl chloride, or a mixture thereof with a copolymerizable monomer or monomers, is about to be carried out. It is also applied to other surfaces within and outside the polymerization vessel coming into contact with the monomer or monomers, such as the blades of a stirrer, a condenser, a heat exchanger, a pump, valves, conduit pipes, sensor probes and baffles.

For the purpose of coating operations in accordance with this invention, the coating compound or compounds is used in the form of a solution. Solvents suitable for this purpose are, for example, water; alcohols, such as methanol and ethanol; esters such as ethyl acetate; and ketones such as acetone and methylethylketone. Any known method of coating, such as brushing and spraying, may be employed insofar as they are suitable for producing uniform coatings on the various surfaces. Preferably, the coatings thus produced are subjected to drying at temperatures ranging from room temperature to about 100° C for a period of one half to 2 hours.

The amount of the coating compound to be applied over the various surfaces, in accordance with this invention, is in the range of from 0.0001 to 500 g/m$^2$, preferably from 0.05 to 10 g/m$^2$. Any amount below this range has an insufficient effect in the prevention of polymer scale formation. On the other hand, any amount above this range has an adverse effect upon the physical properties of the resultant products.

Following the completion of the above coating and drying operations, the atmosphere in the polymerization vessel is replaced with nitrogen gas. The monomer or monomers are then charged together with a polymerization initiator. This is followed by the process of bulk polymerization. The process of bulk polymerization is known, and it may be carried out in either a single-stage or a two-stage operation.

The polymerization initiators useful in this method are preferably soluble in the monomers. Examples are acylperoxides, such as lauroylperoxide and benzoylperoxide; peroxyesters of organic acids such as t-butylperoxypivalate; peroxydicarbonates, such as diisopropylperoxydicarbonate and di-sec-butylperoxydicarbonate; azo compounds, such as azobisisobutyronitrile, azobismethoxydimethylvaleronitrile and azobisdimethylvaleronitrile; and acetylcyclohexylsulfonylperoxide. The amount of initiators used ranges from about 0.005 to about 3% by weight based on the weight of the monomer or monomers.

The monomers which are copolymerizable with vinyl chloride monomer and useful in the method of the present invention are exemplified by the following: vinyl halides other than vinyl chloride, such as vinyl fluoride and vinyl bromide; olefins, such as ethylene, propylene and n-butene; vinyl esters, such as vinyl acetate, vinyl propionate and vinyl laurate; unsaturated acids, such as acrylic acid, methacrylic acid and itaconic acid, and their esters; vinyl ethers, such as methyl vinyl ether and ethyl vinyl ether; maleic acid, fumaric acid, maleic anhydride and their derivatives; acrylonitrile and its derivatives; and vinylidene halides, such as vinylidene chloride and vinylidene fluoride.

The vessel in which the bulk polymerization of the present invention carried out is not particularly limited. It may be a reactor suitable for the polymerization of a mixture composed mostly of the monomer or monomers without a large amount of a liquid medium used for heat transfer and formation of monomer droplets. The vessel proper is usually glass-lined or made of stainless steel and equipped with a condenser, a heat exchanger, a pump, valves, conduit pipes, measuring instruments, baffles, etc.

In accordance with the method of the present invention, polymer scale deposition on the surfaces of the above-mentioned various accessories, as well as the inner walls of the polymerization vessel, can be reduced to a great extent; any polymer scale still deposited on those surfaces can be easily removed by washing with water so that the surfaces become clean and lustrous. Thus, the clean-up work to be carried out after each polymerization run is very simple, and production efficiency can be remarkably increased.

The method of the present invention will be further illustrated by the following examples, which should not be construed as limiting the generality of what is elsewhere herein stated.

EXAMPLE 1

For the purpose of this example two different autoclaves made of stainless steel were used. The first autoclave being of a vertical type having a 2-liter capacity and equipped with a turbine-blade stirrer The second being of a horizontal type having a 4-liter capacity and equipped with a frame stirrer. Each autoclave had its inner walls, and other surfaces coming into contact with the polymerization medium, coated with a 5% aqueous solution of one of the various phosphoric coating compounds as indicated in Table I. The coated surfaces were dried at 80° C for 1 hour, and then the autoclaves were evacuated nitrogen gas was substituted for the oxygen.

Thereupon, 700 g of vinyl chloride and 0.105 g of azobismethoxydimethylvaleronitrile were charged into the first autoclave, followed by partial polymerization at 62° C for 1 hour with stirring at a velocity of 1,000 r.p.m. The resultant partial polymerizate was then transferred into the second autoclave, in which 700 g of vinyl chloride and 0.6 g of azobisdimethylvaleronitrile had been charged, and then subjected to polymerization at 57° C for 8 hours with stirring at 100 r.p.m. The various coating compounds and the test conditions used as well as the results obtained are set forth in Table I as Experiments 1–10.Experiment 11 where no coating was done was a control.

The resulting polymerizate was cooled unreacted monomer was separated therefrom and polymer was taken out of the second autoclave and stripped of any monomer adsorbed therein. The polymer particles thus obtained were put on a 10-mesh screen (Tyler Standard) and those retained on the screen were weighed. Polymer scale build-up on the inner walls of each autoclave and the stirrer was removed, collected and weighed. In Table I, the amounts of polymer scale in each of the two autoclaves are shown. The amounts shown under the heading "Amount of Scale formed with respect to the second autoclave" are a total of the amount of scale itself and that of the coarser particles retained on the 10-mesh screen for the individual runs. In the table, the effect of water washing or flushing and the condition of the inner wall surfaces are also given.

conditions and procedures as set forth in Example 1 except that 10% solutions of coating mixtures of the various phosphoric compounds and borates, were used in a mixed solvent of water and ethanol (3:1 by volume). The amount of coating mixtures used being 1.5 g per square meter, and the coated surfaces were dried at 70° C for 1 hour. The compounds and the conditions used, together with the results obtained, are set forth in Table II.

Table I

| Experiment No. | 1 | 2 | 3 | 4 | 5 |
|---|---|---|---|---|---|
| Coating compound | Trimethyl phosphate | Disodium monolauryl phosphate | Monosodium di(POE(10)-lauryl) phosphate* | Tri(POE(10)-lauryl) phosphate* | Sorbitan mono-phosphate |
| Amount of use per m² of coating | 2.0 g | 2.0 g | 2.0 g | 2.0 g | 2.0 g |
| Amount of scale formed with respect to: | | | | | |
| First autoclave | 3.4 g | 3.0 g | 3.1 g | 2.7 g | 2.5 g |
| Second autoclave | 85 g | 74 g | 71 g | 68 g | 70 g |
| Effect of water flushing | Under a flush pressure of 2 kg/cm²G, all scale buildup was removed from all surfaces except part of the stirrer blades. | Under a flush pressure of 2 kg/cm²G, all scale buildup was removed from al surfaces. | '' | '' | '' |
| Condition of the inner wall surfaces after water flushing | Showing metallic luster | '' | '' | '' | '' |

| Experiment No. | 6 | 7 | 8 | 9 | 10 | 11** |
|---|---|---|---|---|---|---|
| Coating compound | Sorbitan ester of triphosphoric acid | Phytic acid | Tetrasodium salt of phytic acid | Glucose-1-phosphate | POE(20)-sorbitan mono-phosphate* | Not used |
| Amount of use per m² of coating | 2.0 g | 2.0 g | 2.0 g | 2.0 g | 2.0 g | — |
| Amount of scale formed with respect to: | | | | | | |
| First autoclave | 2.5 g | 3.0 g | 2.7 g | 3.2 g | 2.1 g | 7.0 g |
| Second autoclave | 69 g | 88 g | 73 g | 80 g | 67 g | 230 g |
| Effect of water flushing | Under a flush pressure of 2 kg/cm²G, all scale buildup was removed from all surfaces. | '' | '' | '' | '' | Under a flush pressure of 10 kg/cm²G, almost no scale was removed. |
| Condition of the inner wall surfaces after water flushing | '' | '' | '' | '' | '' | Covered with a whitish layer. |

Notes:
*POE is for polyoxyethylene.
**Experiment No. 11 is a control.

EXAMPLE 2

Using two autoclaves identical to those of Example 1, Experiments 12–22 were carried out under the same

TABLE II

| Experiment No. | 12 | 13 | 14 | 15 | 16 | 17 |
|---|---|---|---|---|---|---|
| Coating mixture | Phytic acid + sodium borate | Phytic acid + potassium borate | Phytic acid + ammonium borate | Phytic acid + calcium borate | Glucose-6-phosphate + sodium borate | Heptasodium salt of phytic acid + potassium borate |
| Amount of scale formed with respect to: | | | | | | |
| First autoclave | 2.3 g | 2.3 g | 2.5 g | 2.2 g | 2.5 g | 2.3 g |
| Second autoclave | 65 g | 64 g | 70 g | 67 g | 70 g | 61 g |
| Effect of water flushing | Under a flush pressure, of 1 kg/ | '' | '' | '' | '' | '' |

TABLE II-continued

| | | | | | |
|---|---|---|---|---|---|
| | cm²G, all scale build-up was removed. | | | | |

| Experiment No. | 18 | 19 | 20 | 21 | 22 |
|---|---|---|---|---|---|
| Coating mixture | Disodium monolauryl phosphate + sodium borate | POE(20)sorbitan monophosphate* + sodium borate | Sorbitan ester of hexametaphosphoric acid + potassium borate | Di(POE(10)-lauryl) phosphate* + ammonium borate | Tri(POE(10)-lauryl) phosphate* + sodium borate |
| Amount of scale formed with respect to: | | | | | |
| Firt autoclave | 2.6 g | 2.2 g | 2.4 g | 2.5 g | 2.4 g |
| Second autoclave | 65 g | 66 g | 69 g | 67 g | 71 g |
| Effect of water flushing | Under a flush pressure, of 1 kg/cm²G, all scale build-up was removed | " | " | " | " |

Note:
*POE is for polyoxyethylene.

EXAMPLE 3

Using two autoclaves identical to those of Example 1, Experiments 23–29 were carried out under the same conditions and procedures as set forth in Example 1 except that a 10% solution of monosodium di(POE(10)-)lauryl)phosphate or a 10% solution of phytic acid and sodium borate (1:1 by weight) in a mixed solvent of water and ethanol (3:1 by volume) was used. The amounts of the coating compounds or mixtures used being as indicated in Table III. The results of these experiments, including the amount of scale formed, the effect of water flushing, the particle size distribution of the polymer produced and the occurrence of fish-eyes in the finished products are shown in the same table.

For the purpose of examining the occurrence of fish-eyes, 100 parts of the polymer produced, 1 part of lead stearate, 1 part of barium stearate, 0.5 part of titanium dioxide, 0.1 part of carbon black and 50 parts of dioctylphthalate (all parts being by weight) were mixed together and kneaded on a roll mill at 150° C for 7 minutes, to ultimately form a sheet 0.2 mm thick. The number of particles remaining ungelled in the rolled sheet over an area of 100 cm² was counted to show the extent of the occurrence of fisheyes.

Table III

| Experiment No. | 23 | 24 | 25 | 26 |
|---|---|---|---|---|
| Coating compound or mixture | Monosodium di(POE(10)-lauryl) phosphate* | " | " | Phytic acid + sodium borate |
| Amount of use per m² of coating | 0.005 g | 2.0 g | 50.0 g | 0.001 g |
| Amount of scale formed with respect to: | | | | |
| First autoclave | 3.8 g | 3.1 g | 3.8 g | 3.9 g |
| Second autoclave | 89 g | 71 g | 80 g | 90 g |
| Effect of water flushing | Under a flush pressure of 3 kg/cm²G, almost all scale build-up was removed from all surfaces except part of the stirrer. | Under a flush pressure of 2 kg/cm²G, all scale buildup was removed. | " | Same as Experiment No. 23 |
| Particle size distribution. % passing through the following mesh (Tyler Standard) screens: | | | | |
| 40 mesh | 91.9 | 93.2 | 95.7 | 91.9 |
| 60 mesh | 90.0 | 89.1 | 90.9 | 90.9 |
| 100 mesh | 33.8 | 34.9 | 40.1 | 36.4 |
| 200 mesh | 7.9 | 5.3 | 4.9 | 7.8 |
| Occurrance of Fish-eyes, pieces | 81 | 48 | 70 | 68 |

| experiment No. | 27 | 28 | 29 | 11** |
|---|---|---|---|---|
| Coating mixture | Phytic acid + sodium borate | " | " | ** |
| Amount of use per | | | | |

Table III-continued

| | | | | |
|---|---|---|---|---|
| m² of coating | 0.05 g | 3.0 g | 50.0 g | ** |
| Amount of scale formed with respect to: | | | | |
| First autoclave | 2.5 g | 2.3 g | 3.0 g | **. |
| Second autoclave | 71 g | 65 g | 70 g | ** |
| Effect of water flushing | Same as Experiment No. 24 | Under a flush pressure of 1 kg/cm²G, all scale buildup was removed. | " | ** |
| Particle size distribution, % passing through the following mesh (Tyler Standard) screens: | | | | |
| 40 mesh | 96.1 | 95.1 | 94.6 | 91.5 |
| 60 mesh | 90.4 | 92.1 | 90.4 | 83.5 |
| 100 mesh | 37.3 | 39.7 | 36.3 | 36.0 |
| 200 mesh | 5.8 | 5.3 | 6.7 | 16.0 |
| Occurrance of Fish-eyes, pieces | 39 | 35 | 49 | 198 |

Notes:
*POE is for polyoxyethylene.
**Experiment No. 11 is a control.

EXAMPLE 4

Using two autoclaves identical to those of Example 1, Experiments 30–32 were carried out under the same conditions and procedures as set forth in Example 1, except that a 10% solution of phytic acid and sodium borate mixed in the varied ratios as indicated in Table IV, in a mixed solvent of water and ethanol (3:1 by volume) was used. The amount of the coating mixture used was 3 g per square meter of coating, and the coated surfaces were dried at 70° C for 1 hour. The results are set out in Table IV.

Table IV

| Experiment No. | 30 | 31 | 32 |
|---|---|---|---|
| Mixing ratio of phytic acid and sodium borate, by weight | 1:5 | 1:1 | 5:1 |
| Amount of scale formed with respect to: | | | |
| First autoclave | 3.0 g | 2.2 g | 2.7 g |
| Second autoclave | 80 g | 64 g | 69 g |
| Effect of water flushing | Under a flush pressure of 2 kg/cm²G, all scale buildup was removed. | Under a flush pressure of 1 kg/cm²G, all scale buildup was removed. | Under a flush pressure of 2 kg/cm²G, all scale buildup was removed from all surfaces except part of the stirrer. |

EXAMPLE 5

Using two autoclaves identical to those of Example 1, Experiments 33–42 were carried out as follows.

The walls and other surfaces coming into contact with monomer within the autoclaves were coated with a 5% solution of a mixture of phytic acid and one of the various polymerization inhibitors as indicated in Table V (the mixing ratio= 2:3 by weight) in a mixed solvent of water and ethanol (3:1 by volume). The amount of both compounds totaled 3 g per square meter of coating, and the coated surfaces were dried at 70° C for 1 hour.

Then 1,400 g of vinyl chloride and 0.21 g of acetylcyclohexylsulfonylperoxide were charged into the finish autoclave, followed by partial polymerization at 62° C for 1 hour with stirring at 1,000 r.p.m. The resulting partial polymerizate was transferred into the second autoclave in which 0.45 g of diisopropylperoxydicarbonate had been charged, and then subjected to further polymerization at 57° C for 6-7 hours with stirring at a velocity of 100 r.p.m. The results obtained from these experiments are set out in Table V.

Table V

| Experiment No. | 33 | 34 | 35 | 36 | 37 |
|---|---|---|---|---|---|
| Polymerization inhibitor | Diphenylamine | Hydroquinone | Naphthoquinone | α-Methylstyrene | 2-Vinyl pyridine |
| Amount of scale formed with respect to: | | | | | |
| First autoclave | 1.7 g | 1.3 g | 1.5 g | 1.2 g | 1.6 g |
| Second autoclave | 46 g | 42 g | 43 g | 40 g | 49 g |
| Effect of water flushing | Under a flush pressure of 2 kg/cm²G, all scale buildup was removed. | " | " | " | " |
| Condition of the inner wall surfaces after water flushing | Showing metallic luster | " | " | " | " |

| Experiment No. | 38 | 39 | 40 | 41 | 42 |

Table V-continued

| Polymerization inhibitor | Cinnamic aldehyde | Pyro-catechol | Bisphenol-A | Cumyl-phenol | Croton-aldehyde |
|---|---|---|---|---|---|
| Amount of scale formed with respect to: | | | | | |
| First autoclave | 1.6 g | 1.2 g | 1.4 g | 1.6 g | 1.7 g |
| Second autoclave | 47 g | 38 g | 45 g | 39 g | 43 g |
| Effect of water flushing | Under a flush pressure of 2 kg/cm²G, all scale buildup was removed. | " | " | " | " |
| Condition of the inner wall surfaces after water flushing | Showing metallic luster | " | " | " | " | were examined; and the results obtained are set out in Table VI.

Table VI

| Experiment No. | 43 | 44 | 45 | 46 | 47 |
|---|---|---|---|---|---|
| Phosphoric compound | Tetrasodium salt of phytic acid | Sorbitan monophosphate | Sorbitan triphosphate | Trimethyl phosphate | Glucose-1-phosphate |
| Amount of scale formed | 1.1 g | 0.9 g | 1.1 g | 1.8 g | 1.2 g |
| Effect of water flushing | Under a flush pressure of 2 kg/cm²G, all scale buildup was removed. | " | " | Under a flush pressure of 2 kg/cm²G, all scale buildup was removed from all surfaces except part of the stirrer blades. | Same as Experiment No. 43 |

| Experiment No. | 48 | 49 | 50 | 51 |
|---|---|---|---|---|
| Phosphoric compound | Monosodium monolauryl phosphate | Tri(POE(10)-lauryl) phosphate* | Monosodium di(POE(10)-lauryl) phosphate* | (POE(20)-sorbitan mono-phosphate* |
| Amount of scale formed | 1.3 g | 1.0 g | 1.0 g | 0.8 g |
| Effect of water flushing | Same as Experiment No. 43 | " | " | " |

Note:
*POE is for polyoxyethylene.

EXAMPLE 6

Using an autoclave identical to the first autoclave of Example 1, Experiments 43–51 were carried out as follows:

The wall and other surfaces coming into contact with monomer within the autoclave were coated with a 5% solution of a mixture of pyrocatechol and one of the various phosphoric compounds as indicated in Table VI (the mixing ratio = 3:2 by weight) in a mixed solvent of water and ethanol (3:1 by volume). The amount of both compound totaled 2 g per square meter of coating, and the coated surfaces were dried at 70° C for 1 hour.

Then, into each autoclave thus coated were charged 1,400 g of vinyl chloride and 0.28 g of azobisdimethylvaleronitrile, followed by partial polymerization at 62° C for 1 hour with stirring at 1,000 r.p.m.

After the content of the autoclave was taken out, the amounts of scale formed and effect of water flushing

EXAMPLE 7

Using two autoclaves identical to those of Example 1, Experiments 52–58 were carried out as follows:

The walls and other surfaces coming into contact with monomer within the autoclaves were coated and treated in accordance with the same procedures and conditions as in Example 6, using the various compounds as mentioned in Table VII as the coating compounds.

Then 1,300 g of vinyl chloride, 100 g of vinyl acetate and 0.201 g of acetylcyclohexylsulfonylperoxide, were charged into the first autoclave, followed by partial polymerization at 62° C for 1 hour with stirring at 1,000 r.p.m. The resulting partial polymerizate was transferred into the second autoclave containing 0.45 g of diisopropylperoxydicarbonate, and then subjected to further polymerization at 57° C for 6-7 hours with stirring at 100 r.p.m. The results obtained from these Experiments are set out in Table VII.

Table VII

| Experiment No. | 52 | 53 | 54 | 55 |
|---|---|---|---|---|
| Coating compound or mixture of compounds | Tetrasodium salt of phytic acid | Sorbitan ester of triphosphoric acid + sodium borate | Tri(POE(10)-lauryl) phosphate* + potassium | (a) Monosodium di(POE(10)-lauryl) phosphate* |

Table VII-continued

| | | | borate | +(b) hydro-quinone |
|---|---|---|---|---|
| Amount of use per m² of coating | 2.0 g | Each compound 1.0 g | Each compound 1.0 g | (a) 1.0 g (b) 2.0 g |
| Amount of scale formed with respect to: | | | | |
| First autoclave | 2.9 g | 2.6 g | 2.3 g | 1.2 g |
| Second autoclave | 73 g | 64 g | 59 g | 39 g |
| Effect of water flushing | Under a flush pressure of 2 kg/cm²G, all scale buildup was removed. | Under a flush pressure of 1 kg/cm²G, all scale buildup was removed. | " | Same as Experiment No. 52 |

| Experiment No. | 56 | 57 | 58* |
|---|---|---|---|
| Coating compound or mixture of compounds | Sorbitan ester of hexametaphosphate + hydroquinone + potassium borate | Tetrasodium salt of phytic acid + hydroquinone + sodium borate | Not used |
| Amount of use per m² of coating | Each compound 1.0 g | Each compound 1.0 g | — |
| Amount of scale formed with respect to: | | | |
| First autoclave | 1.1 g | 0.8 g | 7.5 g |
| Second autoclave | 39 g | 37 g | 229 g |
| Effect of water flushing | Same as Exp. No. 53 | " pressure of | Under a flush 5 kg/cm²G, almost no scale buildup was removed. |

Note:
*Example 58 is a control.
*POE is for polyoxyethylene

EXAMPLE 8

Using two autoclaves identical to those of Example 1, Experiments 59-62 were carried out as follows:

The walls and other surfaces coming into contact with monomer within the autoclaves were coated and treated in accordance with the same procedures and conditions as in Example 6, using the various compounds as mentioned in Table VIII as the coating compounds.

Then, the polymerization of vinyl chloride was performed under conditions similar to those described in Example 5, obtaining the results as set out in Table VIII.

EXAMPLE 9

Using two autoclaves identical to those of Example 1, Experiments 63-66 were carried out as follows:

The walls and other surfaces coming into contact with monomer within each autoclave were coated with a 5% solution of a mixture of phytic acid, sodium borate and hydroquinone (1:1:2 by weight) in a mixed solvent of water and ethanol (3:1 by volume) in the amount as specified in Table IX, and the coated surfaces were dried at 70° C for 1 hour.

Then, the polymerization of vinyl chloride was carried out under conditions similar to those described in Example 5, obtaining the results as shown in Table IX. The occurrence of fish-eyes in the table was determined by the same manner as set forth in Example 3.

Table VIII

| Experiment No. | 59 | 60 | 61 | 62 |
|---|---|---|---|---|
| Coating compound and its amount in g/m² of coating in parentheses | Sodium borate (1.0); pyrocatechol (2.0); tetrasodium salt of phytic acid (1.0) | Potassium borate (1.0); pyrocatechol (2.0); tetrasodium salt of phytic acid (1.0) | Ammonium borate (1.0); pyrocatechol (2.0); tetrasodium salt of phytic acid (1.0) | Calcium borate (1.0); pyrocatechol (2.0); tetrasodium salt of phytic acid (1.0) |
| Amount of scale formed with respect to: | | | | |
| First autoclave | 0.9 g | 0.7 g | 1.1 g | 1.0 g |
| Second autoclave | 35 g | 33 g | 39 g | 30 g |
| Effect of water flushing | Under a flush pressure of 1 kg/cm²G, all scale buildup was removed. | " | " | " |

Table IX

| Experiment No. | 63 | 64 | 65 | 66 |
|---|---|---|---|---|
| Amount of use per $m^2$ of coating | 0.005g | 0.1g | 3.0g | 50g |
| Amount of scale formed with respect to: | | | | |
| First autoclave | 1.5g | 0.9g | 0.8g | 1.1g |
| Second autoclave | 51g | 40g | 32g | 40g |
| Effect of water flushing | Under a flush pressure of 2 kg/cm²G, all scale build-up was removed from all surfaces except part of the stirrer. | Under a flush pressure of 1 kg/cm²G, all scale buildup was removed. | " | " |
| Particle size distribution, % passing through the following mesh (Tyler Standard) screens: | | | | |
| 40 mesh | 93.7 | 93.2 | 95.7 | 93.8 |
| 60 mesh | 90.0 | 89.4 | 91.1 | 90.1 |
| 100 mesh | 34.4 | 33.8 | 35.6 | 41.3 |
| 200 mesh | 7.7 | 5.3 | 4.4 | 3.9 |
| Occurance of Fish-eyes, pieces | 49 | 23 | 20 | 25 |

What is claimed is:

1. In a method for the bulk polymerization of vinyl chloride monomer or a mixture thereof with a copolymerizable monomer or monomers, the improvement which comprises coating the walls of a polymerization vessel and other surfaces coming into contact with the monomer or monomers, prior to the polymerization, with a solution of at least one phosphoric compound selected from the group consisting of phosphoric esters, polyphosphoric esters, and their alkali metal salts thereof.

2. The method as claimed in claim 1 wherein said phosphoric ester is an ester of phosphoric acid with a monovalent alcohol.

3. The method as claimed in claim 1 wherein said phosphoric ester is trimethyl phosphate.

4. The method as claimed in claim 1 wherein said phosphoric ester is polyoxyethylene monolauryl phosphate.

5. The method as claimed in claim 1 wherein said phosphoric ester is selected from the group consisting of glucose-1-phosphoric acid, glucose-6-phosphoric acid, D-fructose-6-phosphoric acid and phytic acid.

6. The method as claimed in claim 1 wherein said phosphoric ester is an ester of phosphoric acid with a polyvalent alcohol.

7. The method as claimed in claim 6 wherein said polyvalent alcohol is selected from the group consisting of ethyleneglycol, glycerine, 1,4-sorbitan, 1,4,3,6-sorbide, sorbitol, mannitol and polyoxyethylene adducts thereof.

8. The method as claimed in claim 1 wherein said polyphosphoric ester is an ester of polyphosphoric acid with a polyvalent alcohol.

9. The method as claimed in claim 8 wherein said polyphosphoric acid is selected from the group consisting of pyrophosphoric acid, triphosphoric acid, trimetaphosphoric acid, tetrametaphosphoric acid and hexametaphosphoric acid.

10. The method as claimed in claim 1 wherein said alkali metal salt is selected from the group consisting of lithium, sodium and potassium salts.

11. The method as claimed in claim 1 wherein the amount of said phosphoric compound is from 0.0001 to 500 g per $m^2$ of coating.

12. The method as claimed in claim 1 wherein the amount of said phosphoric compound is from 0.05 to 10 g per $m^2$ of coating.

13. The method as claimed in claim 1 wherein said phosphoric compound is dissolved in a solvent prior to coating and dried after coating.

14. The method as claimed in claim 1 wherein said phosphoric compound has substantial solubility in water.

15. In a method for the bulk polymerization of vinyl chloride monomer or a mixture thereof with a copolymerizable monomer or monomers, the improvement which comprises coating the walls of a polymerization vessel and other surfaces coming into contact with the monomer or monomers, prior to the polymerization, with a solution of a mixture of at least one phosphoric compound selected from the group consisting of phosphoric esters, polyphosphoric esters and their alkali metal salts thereof and at least one borate.

16. The method as claimed in claim 15 wherein said borate is selected from the group consisting of alkali metal borates, alkali earth metal borates and ammonium borate.

17. The method as claimed in claim 15 wherein the amount of said borate is from 0.1 to 10 parts by weight per part by weight of said phosphoric compound.

18. The method as claimed in claim 15 wherein the amount of said mixture is from 0.0001 to 500 g per $m^2$ of coating.

19. The method as claimed in claim 15 wherein the amount of said mixture is from 0.05 to 10 g per $m^2$ of coating.

20. In a method for the bulk polymerization of vinyl chloride monomer or a mixture thereof with a copolymerizable monomer or monomers, the improvement which comprises coating the walls of a polymerization vessel and other surfaces coming into contact with the monomer or monomers, prior to the polymerization, with a solution of a mixture of at least one phosphoric compound selected from the group consisting of phosphoric esters, polyphosphoric esters and their alkali metal salts thereof and at least one polymerization inhibitor.

21. The method as claimed in claim 20 wherein said polymerization inhibitor is selected from the group consisting of diphenylamine, hydroquinone, naphthoquinone, cumylphenols, pyrocatechol, bisphenol A, 2-vinylpyridine, α-methylstyrene, cinnamic aldehyde and crotonaldehyde.

22. The method as claimed in claim 20 wherein the amount of said polymerization inhibitor is 0.1 to 10 parts by weight per part by weight of said phosphoric compound.

23. The method as claimed in claim 20 wherein the amount of said mixture is from 0.0001 to 500 g per $m^2$ of coating.

24. The method as claimed in claim 20 wherein the amount of said mixture is from 0.05 to 10 g per $m^2$ of coating.

25. In a method for the bulk polymerization of vinyl chloride monomer or a mixture thereof with a copolymerizable monomer or monomers, the improvement which comprises coating the walls of a polymerization vessel and other surfaces coming into contact with the monomer or monomers, prior to the polymerization, with a solution of a mixture of at least one phosphoric compound selected from the group consisting of phosphoric esters, polyphosphoric esters and their alkali metal salts thereof, at least one borate and at least one polymerization inhibitor.

26. The method as claimed in claim 25 wherein the amount of the said mixture is from 0.0001 to 500 g per $m^2$ of coating.

27. The method as claimed in claim 25 wherein the amount of said mixture is from 0.05 to 10 g per $m^2$ of coating.

* * * * *